(12) United States Patent
Moore et al.

(10) Patent No.: US 9,914,137 B1
(45) Date of Patent: Mar. 13, 2018

(54) SELECTIVE FLOCCULATION OF IMPURITIES FROM SILICATES AND CLAYS

(71) Applicant: Arr-Maz Products, L.P., Mulberry, FL (US)

(72) Inventors: Lucas R. Moore, Marietta, GA (US); David Taylor, Lakeland, FL (US); Kevin Price, Tampa, FL (US); Guoxin Wang, Lakeland, FL (US)

(73) Assignee: Arr-Maz Products, L.P., Mulberry, FL (US)

( * ) Notice: Subject to any disclaimer, the term of this patent is extended or adjusted under 35 U.S.C. 154(b) by 76 days.

(21) Appl. No.: 15/018,053

(22) Filed: Feb. 8, 2016

Related U.S. Application Data

(60) Provisional application No. 62/255,237, filed on Nov. 13, 2015.

(51) Int. Cl.
| | |
|---|---|
| *B03D 3/06* | (2006.01) |
| *C01B 33/20* | (2006.01) |
| *C01B 33/40* | (2006.01) |

(52) U.S. Cl.
CPC .............. *B03D 3/06* (2013.01); *C01B 33/20* (2013.01); *C01B 33/40* (2013.01); *C01P 2006/80* (2013.01)

(58) Field of Classification Search
CPC ............ B03D 3/06; C01B 33/20; C01B 33/40
See application file for complete search history.

(56) References Cited

U.S. PATENT DOCUMENTS

| | | | | |
|---|---|---|---|---|
| 1,251,057 A | * | 12/1917 | Langford | .................. C01F 7/26 |
| | | | | 423/124 |
| 2001/0022282 A1 | * | 9/2001 | Nagaraj | .................... B03B 1/04 |
| | | | | 209/5 |

OTHER PUBLICATIONS

Somasundaran et al (Selective flocculation of fines, Trans. Nonferrous. Met. Soc. China. vol. 10, Special Issue (2000) pp. 8-11).*

* cited by examiner

*Primary Examiner* — Melvin C. Mayes
*Assistant Examiner* — Michael Forrest
(74) *Attorney, Agent, or Firm* — Head, Johnson, Kachigian & Wilkinson, PC

(57) ABSTRACT

A method of removing impurities from silicates or clays through selective flocculation. The method comprises mixing a chemical product with silicates or clays, where the chemical product comprises a copolymer of acrylic acid, acrylamide, or a combination of acrylic acid and acrylamide with at least one of the following monomers: hydroxyl ethyl methacrylate, 2-acrylamido-2-methyl propane sulfonic acid, and/or 3-allyloxy-1,2-propanediol, or a derivative thereof; allowing impurities to separate from the silicates or clays; and removing the impurities from the silicates or clays. The chemical product may further comprise tannic acid, where the active tannic acid to active polymer concentration is 1% to 25% tannic acid, or more particularly 1% to 5% tannic acid.

18 Claims, No Drawings

SELECTIVE FLOCCULATION OF IMPURITIES FROM SILICATES AND CLAYS

CROSS REFERENCE

This is based on and claims priority to U.S. Provisional Patent Application No. 62/255,237 filed Nov. 13, 2015.

BACKGROUND OF THE INVENTION

Field of the Invention

This invention relates generally to the removal of impurities from silicates and clays and more particularly, but not by way of limitation, to a product and process of using the product to flocculate or assist in the flocculation of impurities from silicates and clay.

Description of the Related Art

Commercial products that contain clays and silica/silicate type minerals require high grade products. Kaolin will require the removal of iron and titanium based minerals, while diatomite will require the removal of carbonate type minerals. Flotation has long been the method of removal or beneficiating, but many are moving towards selective flocculation.

Based on the foregoing, it is desirable to provide a chemical product that will coordinate to the calcium or magnesium in carbonates.

It is further desirable for the chemical product to either flocculate the carbonate directly, activate it to be further treated with a polymeric flocculant, or simply block its coordination sites from allowing it to interact with other chemistries that could be used to separate the minerals.

It is further desirable, as it relates to kaolin, for the chemical product to yield the same end result by yielding the separation of iron and titanium minerals from kaolin.

SUMMARY OF THE INVENTION

In general, in a first aspect, the invention relates to a method of removing impurities from silicates or clays through selective flocculation. The method comprises mixing a chemical product with silicates or clays, where the chemical product comprises a copolymer of acrylic acid, acrylamide, or a combination of acrylic acid and acrylamide with a functional monomer; allowing impurities to separate from the silicates or clays; and removing the impurities from the silicates or clays. The functionalized monomer may be a hydroxyalkyl alkylacrylate monomer comprised of hydroxylalkyl moiety and an alkylacrylate moiety, where the alkyl group is selected from C1-6 linear or branched alkyl groups, such as hydroxymethyl, hydroxyethyl, hydroxypropyl, hydroxybutyl, hydroxypentyl, and hydroxyhexyl, and all constitutional isomers of such alkyl groups. The hydroxyl group may be a hydroxyl or protonated or ionized form of hydroxyl. The functionalized monomer may be at least one of the following monomers: hydroxyl ethyl methacrylate, 2-acrylamido-2-methyl propane sulfonic acid, and/or 3-allyloxy-1,2-propanediol, or a derivative thereof.

The method may further comprise mixing a dispersant with the silicates or clays prior to mixing the chemical product with the silicates or clays. The method may further comprise adding a second polymeric product to enhance settling characteristics.

The chemical product may be a polymer, copolymer, or tertpolymer, and may be a solution, emulsion, or dry. The weight average molecular weight of the chemical product may be at least 3 K daltons, and the charge of the functionalized monomer may be between around 5% to around 50%, or more particularly between around 10% to around 30%.

The chemical product may complex with magnesium or calcium carbonate preferentially over diatomite or sand and with iron or titanium containing minerals preferentially over clays like kaolin. The chemical product may lead to the separation of minerals containing iron, titanium, or carbonate away from kaolin and diatomite.

The chemical product may further comprise tannic acid at a concentration of 1% to 25%, preferably 1% to 5%, based on the active polymer in the chemical product.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a chemical product that may be used at a mine site to flocculate impurities from silicates and clays. A dispersant may be introduced along with or prior to the addition of the chemical product. A second polymeric product may be used to enhance the settling characteristics.

The chemical product may be a polymer, a copolymer, or a tertpolymer. The chemical product may be a solution, emulsion, or dry. The base chemistry may be acrylic acid, acrylamide, or a combination of both. One or more monomers may be added to the polymer for metal complexation.

The functionalized monomer may be a hydroxyalkyl alkylacrylate monomer comprised of hydroxylalkyl moiety and an alkylacrylate moiety, where the alkyl groups may be selected from $C_{1-6}$ linear or branched alkyl groups, for example: hydroxymethyl, hydroxyethyl, hydroxypropyl, hydroxybutyl, hydroxypentyl, and hydroxyhexyl, and all constitutional isomers of such alkyl groups. The hydroxyl group may be a hydroxyl or protonated or ionized forms of hydroxyl, such as alkali or ammonium salt of hydroxyl.

The monomers may include hydroxyl ethyl methacrylate, 2-acrylomido-2-methyl propane sulfonic acid, and/or 3-allyloxy-1,2-propanediol, or some derivative thereof. The weight average molecular weight may be from around 10 K daltons to millions of daltons, or may be as low as 3 K daltons. The charge of the functionalized monomer may be around 5 to 50%, or more particularly around 10 to 30%, but may be higher or lower.

The polymer may be synthesized in accordance with any variety of polymerization methods, including, but not limited to, free radical polymerization, controlled radical polymerization such as atom transfer radical polymerization, reversible addition fragmentation chain transfer, nitroxide mediated polymerization, cationic polymerization, or ionic polymerization. Suitable reaction media include, but are not limited to, water solution, aqueous solution, water and polarity changing water soluble organic compounds such as alcohols, ethers, ketones, hydroxyl ethers, emulsion, and microemulsion.

The polymer may be diluted with water down to a 3.8% active solution. Tannic acid may be added and mixed until visually dissolved. The chemical product may have an active tannic to active polymer concentration of 1% to 25% tannic acid, preferably 1% to 5% tannic acid.

The chemical product may complex with the magnesium or calcium carbonate, preferentially over the diatomite or sand. The chemical product may complex with the iron or titanium containing minerals preferentially over clays like kaolin. Both may lead to the separation of minerals containing iron, titanium, or carbonate away from kaolin and diatomite.

By way of example, but not by way of limitation, the polymer was made as discussed above. It was then diluted with water down to a 3.8% active solution. At this concentration, 0.038 g, 0.095 g, and 0.195 g of tannic acid were added and mixed until visually dissolved. This resulted in an active tannic to active polymer concentration of 5%, 13%, and 25% tannic acid, respectively. These products were tested, and it was found that the 5% concentration was much more efficient at removing the iron and titanium containing minerals. It is expected that a concentration between 1% and 5% tannic acid would be most effective. The testing has shown that the combination of tannic acid with the polymer set forth above can increase removal by 50% to 60%.

Whereas, the devices and methods have been described in relation to the drawings and claims, it should be understood that other and further modifications, apart from those shown or suggested herein, may be made within the spirit and scope of this invention.

What is claimed is:

1. A method of removing impurities from silicates or clays, the method comprising:
   mixing a chemical product with silicates or clays, where the chemical product comprises a copolymer of:
   acrylic acid, acrylamide, or a combination of acrylic acid and acrylamide; and
   a functionalized monomer, where the functionalized monomer is a hydroxyalkyl alkylacrylate monomer;
   allowing impurities to separate from the silicates or clays; and
   removing the impurities from the silicates or clays.

2. The method of claim 1 where the hydroxyalkyl alkylacrylate monomer is comprised of hydroxyalkyl moiety and an alkylacrylate moiety, where the alkyl group of either or both the hydroxyalkyl moiety and/or the alkylacrylate moiety is selected from $C_{1-6}$ linear or branched alkyl groups.

3. The method of claim 2 where the alkyl group of the hydroxyalkyl moiety is selected from hydroxymethyl, hydroxyethyl, hydroxypropyl, hydroxybutyl, hydroxypentyl, and hydroxyhexyl, and all constitutional isomers of such alkyl groups.

4. The method of claim 2 where the hydroxyl group is a hydroxyl or protonated or ionized form of hydroxyl.

5. A method of removing impurities from silicates or clays, the method comprising:
   mixing a chemical product with silicates or clays, where the chemical product comprises a copolymer of:
   acrylic acid, acrylamide, or a combination of acrylic acid and acrylamide; and
   a functionalized monomer, where the functionalized monomer is at least one of the following monomers: hydroxyl ethyl methacrylate and/or 3-allyloxy-1,2-propanediol, or a derivative thereof;
   allowing impurities to separate from the silicates or clays; and
   removing the impurities from the silicates or clays.

6. The method of claim 1 further comprising mixing a dispersant with the silicates or clays prior to mixing the chemical product with the silicates or clays.

7. The method of claim 1 further comprising adding a second polymeric product to enhance settling characteristics.

8. The method of claim 1 where the chemical product is a solution, emulsion, or dry.

9. The method of claim 1 where the weight average molecular weight of the chemical product is at least 3 K daltons.

10. The method of claim 9 where the weight average molecular weight of the chemical product is at least 10 K daltons.

11. The method of claim 1 where the charge density of the functionalized monomer is between around 5% and around 50%.

12. The method of claim 11 where the charge density of the functionalized monomer is between around 10% and around 30%.

13. The method of claim 1 where the chemical product complexes with magnesium or calcium carbonate preferentially over diatomite or sand.

14. The method of claim 1 where the chemical product complexes with iron or titanium containing minerals preferentially over clays.

15. The method of claim 1 where the chemical product leads to the separation of minerals containing iron, titanium, or carbonate away from kaolin and diatomite.

16. The method of claim 1 where the chemical product further comprises tannic acid mixed with the copolymer.

17. The method of claim 16 where the chemical product has an active tannic acid to active polymer concentration of 1% to 25% tannic acid.

18. The method of claim 17 where the chemical product has an active tannic acid to active polymer concentration of 1% to 5% tannic acid.

\* \* \* \* \*